United States Patent [19]

Miller et al.

[11] 3,860,759

[45] Jan. 14, 1975

[54] SEISMIC SYSTEM WITH DATA COMPRESSION

[75] Inventors: Wayne F. Miller, Arcadia; Francis E. Lehner, Monrovia, both of Calif.

[73] Assignee: California Institute of Technology, Pasadena, Calif.

[22] Filed: Apr. 10, 1972

[21] Appl. No.: 242,753

Related U.S. Application Data

[63] Continuation of Ser. No. 74,642, Sept. 23, 1970, abandoned.

[52] U.S. Cl. ................ 179/15.55 R, 340/15.5 TG, 340/15.5 CP
[51] Int. Cl. ......................................... H04b 15/00
[58] Field of Search ............... 179/15.55 R, 1 SA; 340/15.5 CP, 15.5 TG; 324/77 D, 77 R

[56] References Cited
UNITED STATES PATENTS

| | | | |
|---|---|---|---|
| 3,102,928 | 9/1963 | Schroeder | 179/1 SA |
| 3,127,477 | 3/1964 | David | 179/15.55 R |
| 3,190,963 | 6/1965 | David | 179/1 SA |
| 3,268,660 | 8/1966 | Flanagan | 179/15.55 R |
| 3,286,031 | 11/1966 | Geddes | 179/1 SA |
| 3,346,695 | 10/1967 | Fant | 179/1 SA |
| 3,509,281 | 4/1970 | King | 179/1 SA |
| 3,546,584 | 12/1970 | Scarr | 179/1 SA |
| 3,573,612 | 4/1971 | Scarr | 179/1 SA |
| 3,649,765 | 3/1972 | Rabiner | 179/1 SA |

*Primary Examiner*—Kathleen H. Claffy
*Assistant Examiner*—Jon Bradford Leaheey
*Attorney, Agent, or Firm*—Lindenberg, Freilich, Wasserman, Rosen & Fernandez

[57] ABSTRACT

A seismic data compression system is disclosed in which in the absence of a significant seismic event, a seismic signal which is filtered, rectified, and passed through a low-pass filter with a long time constant is sampled at a low rate to provide an indication of changes in background noise. When an event is detected, the system is switched to an event-sampling mode in which the envelope of the seismic signal and the number of zero crossing of the signal are sampled at a higher rate than that used in the absence of an event.

18 Claims, 4 Drawing Figures

INVENTORS
WAYNE F. MILLER
FRANCIS E. LEHNER
BY
Lindenberg, Freilich & Wasserman
ATTORNEYS

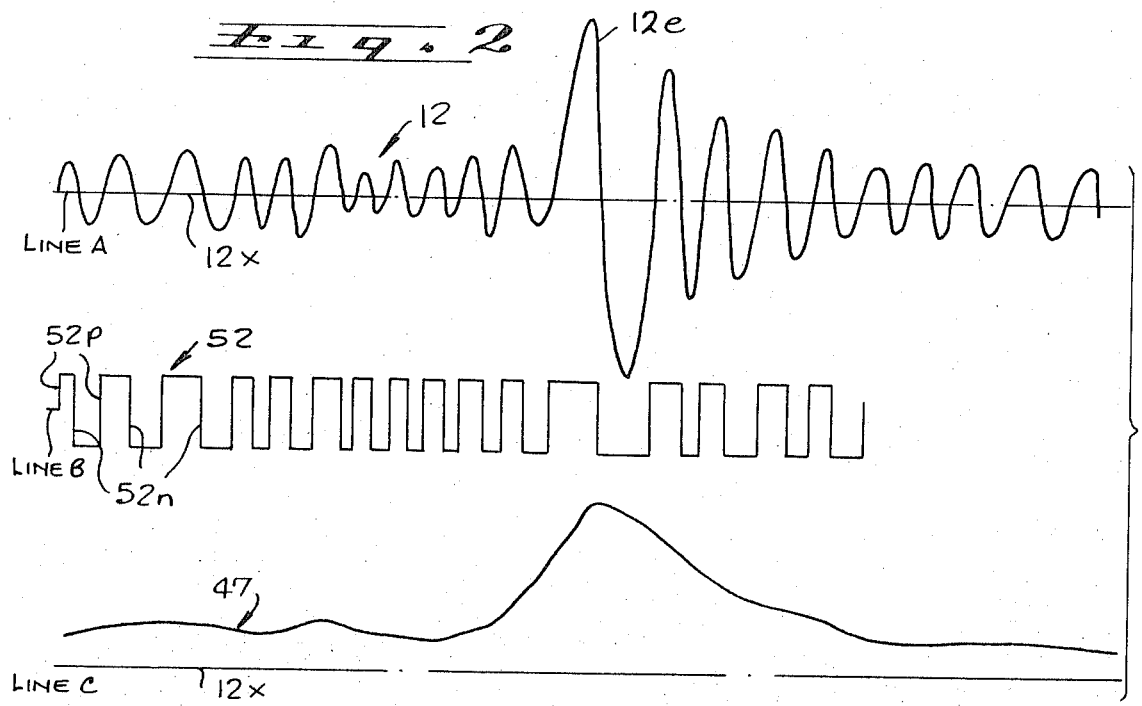
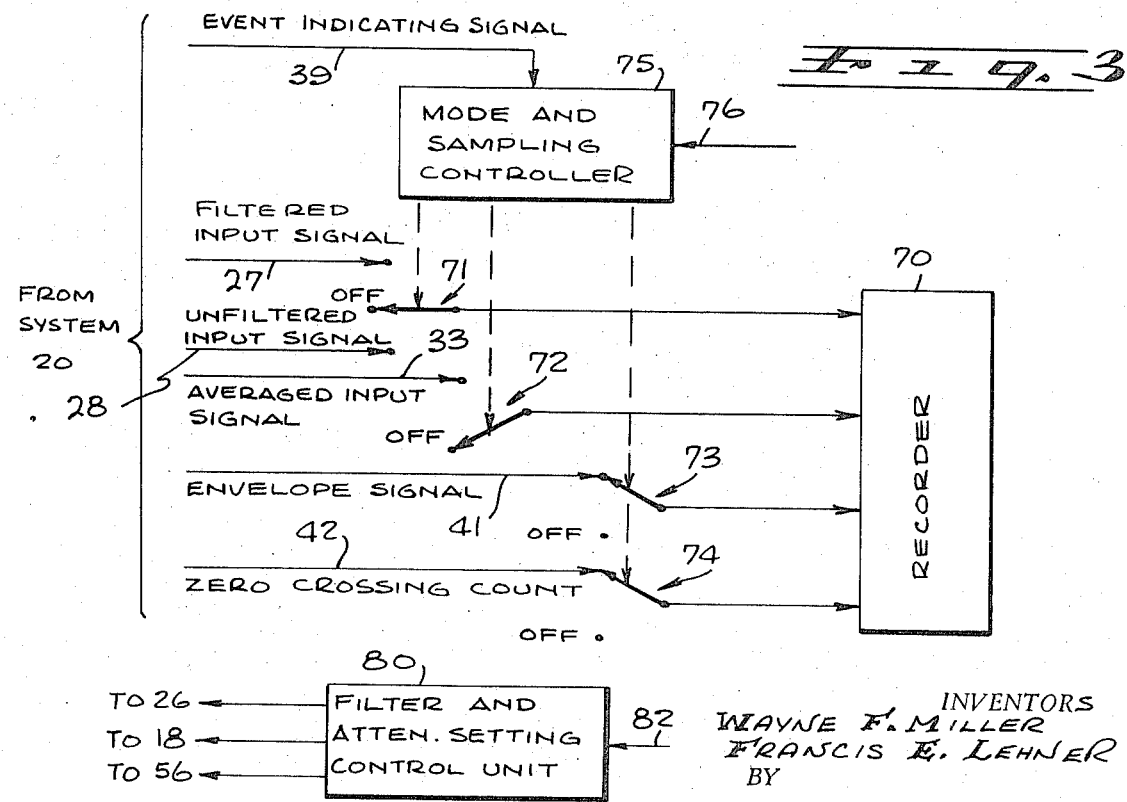

SEISMIC SYSTEM WITH DATA COMPRESSION

This is a continuation of application Ser. No. 74,642, filed Sept. 23, 1970 now abandoned.

BACKGROUND OF THE INVENTION

1. Field of the Invention

The present invention generally relates to a data compression system and, more particularly, to a system for compressing analog data, which is supplied to the system in a manner which preserves most of the desired information in the original data.

2. Description of the Prior Art

Ordinarily, when a phenomena produces an analog signal, such as an alternating current (AC) signal, it is desirable to have a complete record of the signal for optimum analysis of the phenomenon. This, however, is not always possible. For example, in space exploration seismic experiments are generally included. The function of these experiments is to produce seismic data which when analyzed may shed light in various seismic phemonema on the planet of interest. The seismic data may be used to determine the amplitude, spectrum, polarization and sources of continuous background microseismic activity of the planet, the planet's tectonical activity, its level, nature and location, as well as the planet's internal structure and composition. The continuous operation of such a seismic experiment produces a very large quantity of data. Since the quantity of data which can be transmitted to Earth is limited and since data is often produced by other experiments, quite often only a small quantity of the seismic data can be transmitted. Consequently, data compression or compaction is required. However, the data compression system must insure that adequate information related to the original seismic date may be derived from the compressed data.

The advantages of data compression are not limited to space exploration experiments. They are equally applicable in Earth seismic exploration and other experiments. For example, data compression in Earth seismic exploration may be used to reduce the amount of seismic data recorded from a continuous seismic experiment, and thereby reduce the recorder's servicing frequency. Similar advantages are achieved in any system in which AC signals are compressed as long as the compressed data contains adequate information of the original AC signals. Although various data compressions have been suggested and employed in different systems, none seems to achieve the desired information in the compressed data unless very expensive, complex and relatively large and bulky components and/or circuits are employed.

OBJECTS AND SUMMARY OF THE INVENTION

It is a primary object of the present invention to provide a system for compressing analog data.

Another object of the present invention is to provide a new system for compressing data in a variable amplitude AC signal.

A further object of the present invention is to provide a new data compression system for seismic type signals, which includes relatively simple components and circuits.

Still another object of the present invention is to provide a novel highly reliable, and relatively inexpensive system for compressing original data in the form of a frequency and amplitude variable AC signal in more than one format.

The manner in which these and other objects of the invention are achieved may best be explained by describing the invention in the context of of a seismic experiment in which the original data is received from a seismometer. From the following, it would, however, become apparent that the novel system may be employed to compress any original analog data in the form of a frequency and amplitude varying AC signal, such as an audio signal or the like. Such an original analog signal may hereafter be referred to simply as the input signal. Briefly, the novel data compression system of the present invention includes an envelope detector whose output represents the envelope or the amplitude modulation characteristics of the input signal after full wave rectification. The system also includes a zero crossing detector which together with a counter provides a count of the zero or axis crossings of the input signal. By sampling the envelope amplitude and the axis crossings at a selected rate adequate information is available for approximate reconstruction and analysis of the original input signal. In one particular example, such a data compression system was used in connection with a seismic experiment on Mars to compress seismic data by a factor of 10 with minimal loss if any of meaningful information.

If desired, the system may further include an arrangement to determine the average amplitude of the input signal in discrete frequency bands over a selected time period. In a seismic experiment, this may be desirable to determine seismic background level, its nature and variation with time. It may be accomplished by filtering, rectifying and averaging the signal over the desired time period.

The system may further include an event detector arrangement which includes an event detector. An event is represented by an increase in signal amplitude above an average amplitude. The latter is turned on whenever the input signal amplitude is a selected multiple of the signal's average amplitude. When an event is detected either the compressed data or the actual input signal with or without filtering may be transmitted to Earth, in a space exploration experiment, or it may be utilized in any appropriate form such as by recording it in an experiment or study performed on Earth.

The novel features of the invention are set forth with particularity in the appended claims. The invention will be best understood from the following description when read in conjunction with the accompanying drawings.

BRIEF DESCRIPTION OF THE DRAWINGS

FIG. 3 is a block diagram of one embodiment of a utilization unit, shown in FIG. 1; and FIG. 4 is a schematic diagram of a novel time dependent delay unit, shown in FIG. 1.

DESCRIPTION OF THE PREFERRED EMBODIMENTS

Figure 1:
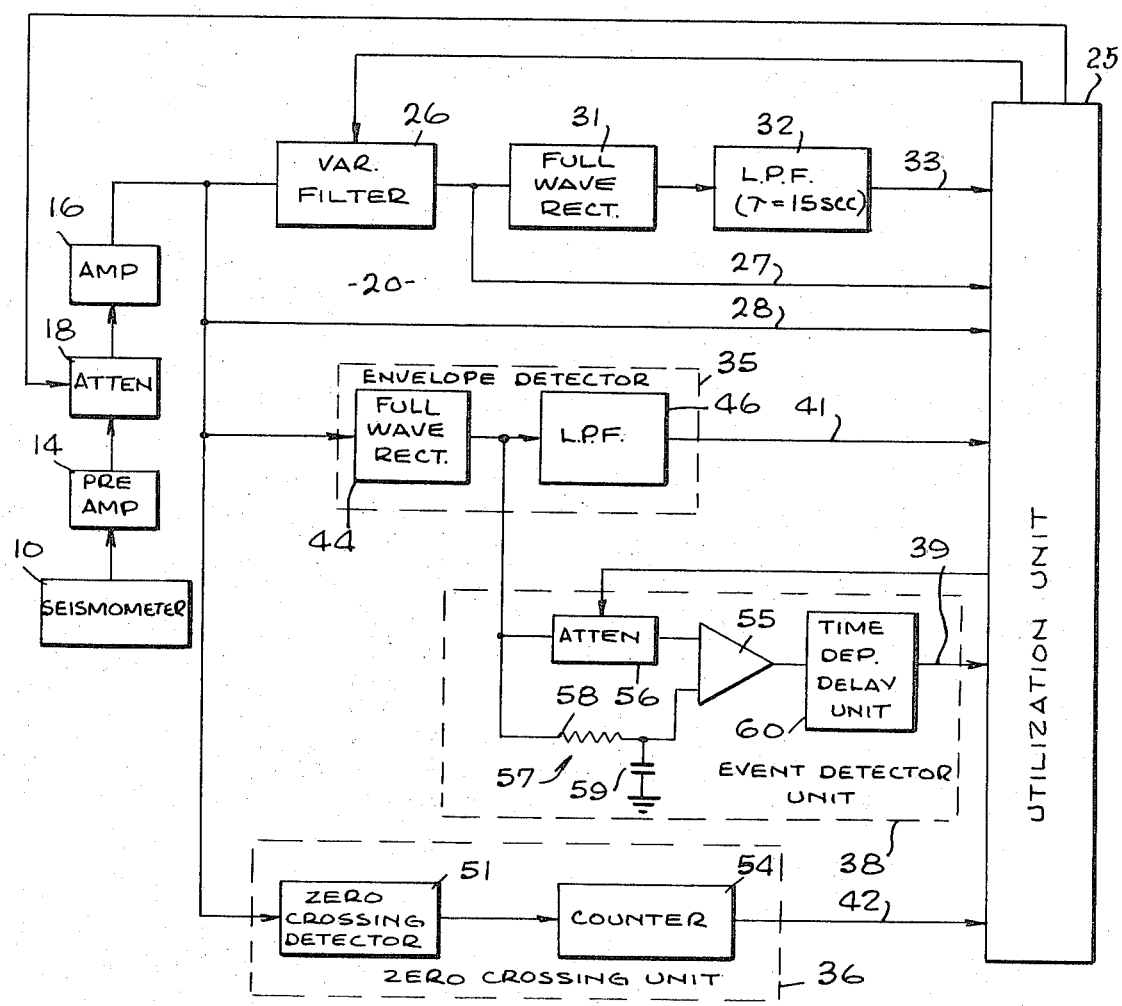
FIG. 1 is a general block diagram of one embodiment of the novel seismic data compression system of the present invention.
Figure 2:
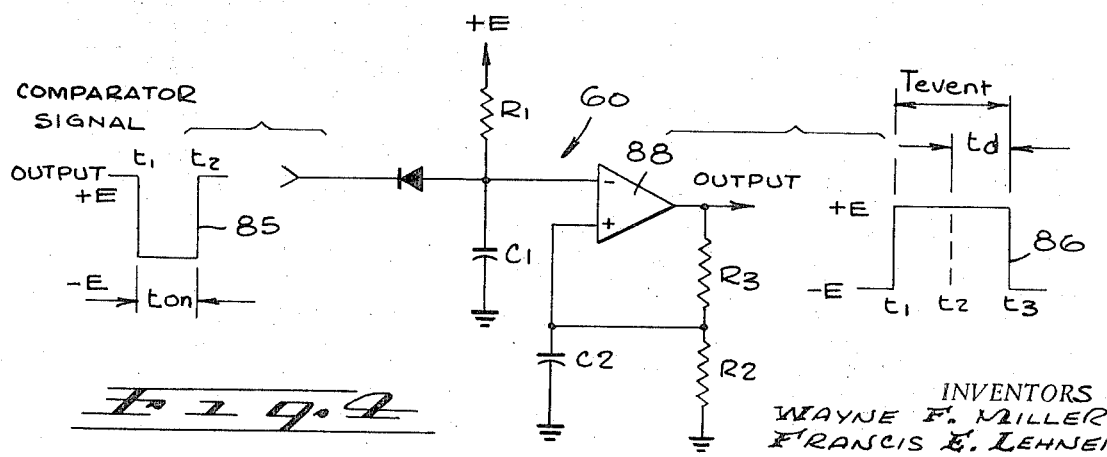
FIG. 2 is a diagram of several waveshapes useful in explaining the operation of the present invention.

Attention is now called to FIG. 1 wherein numeral 10 designates a seismometer. The seismometer's output, in the form of a continuous frequency and amplitude varying AC signal, designated by 12 in line A of FIG. 2, is amplified by a pre-amplifier 14, whose output is in turn supplied to an amplifier 16 through an attenuator 18. The latter is assumed to be of the adjustable type to control the total amplification of the seismometer's output by controlling the total gain of pre-amplifier 14 and amplifier 16. The amplified seismometer output represents the input signal to the data compression system of the present invention, which is designated in FIG. 1 by numeral 20.

Briefly, the data compression system 20, in response to the input signal, provides a plurality of outputs which are supplied to a utilization unit 25. Therein, the system's outputs are sampled at selected rates, depending on the desired data compression ratio and the characteristics of the input signal. When data compression is not required, the system may be thought as operating in a high sampling mode in which the unit samples the input signal, after being filtered in a filter 26. In practice, filter 26 is a variable low-pass filter with several, e.g., 4, cut-off frequencies. Thus, the filter's cut-off frequency is determined by its setting. The filtered input signal is shown supplied to unit 25 on line 27. If desired, the unfiltered input signal may be supplied directly to the unit 25 via line 28. In this mode, either the unfiltered or filtered input signal is sampled at a high enough rate for subsequent adequate reconstruction of the input signal. Assuming that the highest frequency in the input signal is $x$ cps, $2x$ samples/sec are generally required. For example, when $x$ is 10, 20 samples/sec are sufficient for adequate input signal reconstruction.

When data compression is required, the system operates in either of two modes, which for explanatory purposes are defined as the normal sampling mode and the event sampling mode. In the absence of a significant seismic event, which will be defined hereafter, the system operates in the normal sampling mode. As seen from FIG. 1, the output of filter 26 is supplied to a full wave rectifier 31 whose output is supplied to a low-pass filter 32 with a long time constant $\tau$, e.g., $\tau = 15$ sec. The output of filter 32 on line 33 which is supplied to unit 25 represents the filtered and rectified seismometer output which is averaged over the time period $\tau$. This output is sampled by unit 25 during the normal sampling mode, i.e., when data compression is required and during the absence of a significant event. This output is useful to determine the seismic background noise or level and its variations with time. Its nature, i.e., its frequency content can be determined by successively setting filter 26 to each of its filter settings. Since changes in the background noise are very gradual, the output on line 33, which can be thought of as the average seismometer output, need be sampled at a very low rate, for example $2y/5$ samples per minute, where $y$ represents the highest frequency of the amplitude modulation of the signal. Thus, a very high compression ratio is achieved in the normal sampling mode. For seismic data $y<<x$ is normal.

As seen from FIG. 1, system 20 includes an envelope detector 35, a zero crossing unit 36 and an event detector unit 38. Briefly, the function of unit 38 is to detect a significant event in the input signal and to supply unit 25 with an event-indicating control signal on line 39. The duration of this signal is a function of the event duration. When this control signal is received by unit 25, it switches to the event sampling mode. In this mode, unit 25 samples the outputs of detector 35 and unit 36, supplied thereto on lines 41 and 42, respectively. The rate at which each of these outputs is sampled is higher than the sampling rate of the seismometer average output on line 33, but is significantly less than the required sampling rate ($2x$) of the input signal in the absence of data compression.

Briefly, the output of envelope detector 35 is a variable amplitude DC signal which represents the envelope of the input signal, while the output of unit 36 is a running count of the cycles of the input signal as represented by its crossings of a reference level or axis, designated by $12x$ in FIG. 2, line A. It has been discovered that by sampling these outputs, the event-related portion of the input signal can be adequately reconstructed for adequate analysis. A satisfactory sampling rate of each of these outputs is $x/10$ cycles/sec. for a total sampling of $x/5$ samples/sec. as compared with an uncompressed sampling rate of $2x$ samples/sec. Thus, a compression ratio of 10 is realized.

In practice, the envelope detector 35 consists of a full wave rectifier 44 to which the output signal is applied for full wave rectification. Thereafter, the rectified input signal is supplied to a smoothing low-pass filter 45, whose output on line 41 is the smoothed DC amplitude modulated envelope of the input signal. This envelope is designated by numeral 47 in FIG. 2, line C.

The zero crossing unit 36 consists of a zero crossing detector 51, which senses the crossings of the zero or reference axis $12x$ by the input signal 12 and provides a constant amplitude square wave output, designated by numeral 52 in FIG. 2, line B. Negative going axis crossings are represented by $52n$ and positive going axis crossings by $52p$. A running count of either the negative or positive going crossings is provided by a counter 54. In the present embodiment, all outputs which are supplied to unit 25 are assumed to be in analog form. Thus, preferably, the output of counter 54 is in analog form, where the output amplitude is representative of the count in the counter. The counter may be chosen to be of a fixed bit length, which is reset whenever its maximum count is exceeded. In such a case, its maximum bit length is chosen to be not less than the expected maximum number of cycles during any sampling period, to insure that the counter does not reset twice during any one sampling period.

As seen from FIG. 1, the event detector unit 38 consists of a comparator 55 which is supplied at one input with the rectified input signal from rectifier 44 through an attenuator 56. The same rectified input signal is supplied to another input of the comparator 55 through a low-pass filter 57, consisting of a resistor 58 and a capacitor 59. The output of filter 57 represents the average seismic background noise or level. Basically, an event is assumed to occur whenever the amplitude of the input signal exceeds the average seismic background level by a selected multiple or ratio. In the present invention, the rectified absolute value or amplitude of the input signal is passed to the comparator through the attenuator 56, while the average seismic background level is supplied thereto through the filter 57. The attenuator is set to provide an attenuation factor equal to the ratio or multiple by which the input signal has to exceed the background level to indicate an event. Consequently, only when an event occurs, represented in FIG. 2, line A, by the large amplitude signal $12e$, does the output of attenuator 56 exceed the output of filter 57. When this occurs, the comparator changes state, producing an event indicating level, which is assumed to indicate that the comparator is ON. The output of the comparator is supplied to a novel time dependent delay unit 60. Unit 60 turns ON, to supply the utilization unit 25 with an event-indicating signal on line 39, as soon as the comparator turns ON. Unit 60 remains turned ON during the entire ON period of the comparator and for an additional period or delay which is a function of the comparator's ON period. Thus, unit 60 can be thought of as a unit which provides a delay which is dependent on the ON period of the comparator. A specific embodiment of unit 60 will be described hereafter in detail.

From the foregoing it should thus be appreciated that in the present invention an event is indicated only when the input signal amplitude exceeds the unknown and probably varying background level, represented by the output of filter 57 by a selected multiple. Thus, the trigger point of the comparator 55, i.e., the reference level with which the output of attenuator 56 is compared is not fixed, but rather is continuously adjusted for the unknown varying background level.

The multiple by which the absolute input signal level has to exceed the background level is controlled by the setting of attenuator 56 which is assumed to be set by unit 25. The latter is also assumed to control the setting of attenuator 18 to control the gain of the seismometer output. Unit 25 is further assumed to control the setting or cutoff frequency of filter 26 to control the frequency content of the averaged input signal or the filtering of the input signal when data compression is not required.

It should be apparent that the actual implementation of the utilization unit greatly depends on the environment in which the novel system is employed. If employed for space exploration, unit 25 can be assumed to be part of the multiplexing unit and a command control unit of a space exploration system, wherein the multiplexing unit samples instruments associated with different experiments at selected or variable rates and, thereafter, communicates the sampled data for transmission to Earth. The various controls for the novel system may be supplied from the command control unit of the space exploration system. Such controls may be preprogrammed or may be in response to Earth commanded control signals.

In an Earth environment the utilization unit 25 may be implemented in different ways depending on the manner in which the sampled signals are to be stored for subsequent use. One example of a simple implementation of the utilization unit 25 is shown in FIG. 3. It should be stressed that the diagrammed arrangement is presented for explanatory purposes and is not intended to limit the invention thereto.

In FIG. 3, the utilization unit 25 is shown including a recorder 70, which is supplied with one or more of the outputs of system 20 through sampling switches 71-74. These are assumed to be controlled by a mode and sampling controlled 75. The latter is assumed to be controlled by an external control signal on line 76, to control the sampling of either the filtered input signal (on line 27) or the unfiltered input signal (on line 28) at the high sampling rate when data compression is not required, or to sample other outputs of system 20 when data compression is required. As previously pointed out when data compression is required, the system operates in the normal sampling mode until an event is detected, when the system switches to the event sampling mode.

In the arrangement shown in FIG. 3 it is assumed that when data compression is required, controller 75 switches switches 71, 73 and 74 to their OFF position and switches switch 72 ON and OFF at the desired normal sampling mode rate to supply the recorder 70 with samples to the averaged input signal. Then when an event is detected and an event-indicating signal is supplied to controller 75 via line 39 from the event detector unit 38 (see FIG. 1), the system is switched to the event sampling mode. In this mode, controller 75 switches switch 72 to the OFF position and switches switches 73 and 74 ON and OFF at the event sampling mode rate in order to supply samples of the envelope signal on line 41 and the zero crossing count on line 42 to the recorder 70. If desired, recorder 70 may include analog to digital converters (not shown) to convert the amplitudes on lines 41 and 42 into digitally recorded numbers. For analog recording, the signal on line 39 could be used to turn on extra channels, speed up the chart rate in recorder 70, etc., so that all data of interest during the event period, as defined by the output unit 60 is recorded.

As shown in FIG. 3, the utilization unit further includes a control unit 80, whose function is to supply signals to control the settings of attenuators 18 and 56 and filter 26. The actual settings controlled by unit 80 may be manually selected or they may be chosen in response to signals transmitted to unit 80 on a line 82. Controller 75 and unit 80 are shown in block form since it should be appreciated that they are easily implemented with conventional circuits to perform their functions as herebefore described. For example, controller 75 may include a clock and a plurality of timers which are selectively activated depending on the sampling mode of operation to in turn control the switching of switches 71-74.

Attention in now directed to FIG. 4 which is a combination block and schematic diagram of time dependent delay unit 60, shown in FIG. 1. As previously pointed out, the unit 60 remains ON during the entire ON period of comparator 55 plus an additional delay period which is a function of the comparator's ON period. In FIG. 4, numeral 85 designates a negative pulse which represents the output signal of comparator 55. The pulse is shown to have a duration $t_{ON} = t_2 - t_1$ which represents the comparator's ON period. The output of unit 60 is a pulse 86 of a duration $T_{event}$ which is equal to $t_{ON} + t_d$, where $t_d = t_3 - t_2$. As previously pointed out, $t_d$ is a function of $t_{ON}$.

In FIG. 4, the unit 60 is shown comprising a comparator 88 with one input, such as the negative input connected to the output of comparator 55 through the diode 89. The same input is connected to the junction point of a resistor $R_1$ and a capacitor $C_1$ which are connected in series between a source of positive potential, designated +E and ground. The other input of the comparator 88 is connected to ground through a resistor $R_2$, and a capacitor $C_2$ as well as to the comparator's output through a resistor $R_3$. The expression for the delay time $t_d$ may be expressed by the following expression:

$$t_d = \tau_1 \ln \frac{2(R_2 + R_3)}{R_3 + 2R_2 e^{-\frac{t_{on}}{\tau_2}}},$$

where $\tau_1 = R_1C_1$ and $\tau_2 = R_2R_3/(R_2 + R_3)C_2$.

The unit 60 is of particular significance when seismic signals are compressed by the system of the present invention. Tests of the event detector unit 38 without unit 60 revealed two problems:

a. The level between the P and S waves of many small seismic events often drops to such a value that causes the comparator 55 to be reset, i.e., to be turned OFF before the S wave arrival and then be retriggered on the S wave; and b. Since the average background during an event contains the event, the comparator 55 is often reset before the level of the event drops to a value close to the average background noise prior to the event, i.e., before all of the interesting portion of the event has been recorded.

It was found that a fixed delay of about 15 seconds following the reset of comparator 55 would solve both of these problems. However, this would mean that regardless of event duration, every event sampling at the event-sampling-mode rate will be performed for no less than 15 seconds. This would reduce the system's data compression rate significantly, if there were many events of vey short duration (1 or 2 seconds) but of an amplitude sufficient to cause triggering of the comparator 55. To circumvent this problem, unit 60 is included to provide an event indicating signal (pulse 86) which is equal to the event duration as defined by the output of comparator 55 (pulse 85) plus a delay proportional to the ON time of comparator 55. The parameters of unit 60 may be chosen to provide very short delay for negligibly small comparator 55 ON time, but one which becomes increasingly longer as the ON time of comparator 55 increases. Actually the ratio of $t_d(\max)/t_d(\min)$ depends on the ratio of $R_2$ to $R_3$ which in turn depends on the minimum differential voltage breakdown of the comparator 88. For example, with a NH0001 operational amplifier as comparator 88 with a differential voltage breakdown of 5 volts, the ratio of $R_2$ to $R_3$ was found to be 1·33. This gives a ratio of $t_d(\max)/t_d(\min)$ of about 6·4. Thus, for a 3 second minimum delay when $t_{ON}$ is nearly zero, a maximum delay of 20 seconds is achieved when $t_{ON}$ approaches infinity. The minimum delay is selected by the choice of $\tau_1$ so that events of very short duration, $t_{ON}$ nearly zero, will result in a negligible $t_d$.

It should be appreciated that various modifications may be made in the arrangements as shown or teachings as explained without departing from the true spirit of the invention. For example, if desired, the outputs of the envelope detector 35 and zero crossing unit 36 may be sampled in the absence of an event rather than when an event is detected. Then when an event is indicated, the filtered or unfiltered input signal may be sampled at a maximum rate to insure optimum reconstruction of the signal during the event duration. Clearly, such an arrangement will result in a reduced compression ratio but may in certain applications be preferred to the sampling rates herebefore assumed. Also, if desired, the full wave rectifiers may be replaced by half wave rectifiers if the rectified signal would allow the proper time constant to be used in the low-pass filters. Thus, the term "rectifier" as used herein should be assumed to mean either a full or a half wave rectifier. Therefore, it is the intention that all such modifications and equivalents be deemed to fall within the scope of the invention as defined in the appended claims.

What is claimed is:

1. In a seismic date compression system of the type to which a variable frequency and amplitude seismic signal is supplied as an input signal, the arrangement comprising:

envelope detecting means responsive to said input signal for providing a variable amplitude direct-current output signal representing the envelope of said input signal, said envelope detecting means including means for rectifying said input signal;

signal crossing detecting means responsive to said input signal for providing an output signal indicative of the number of crossings of said input signal with respect to a reference potential;

event detecting means responsive to said rectified input signal for providing an event-indicating signal of a duration which is not less than a duration during which the amplitude of said rectified input signal exceeds by a preselected ratio the average amplitude of said rectified input signal over a preceding selected period; and means for sampling the output signals of said envelope detecting means and said signal crossing detecting means during the duration of said event-indicating signals.

2. The arrangement as recited in claim 1 wherein said event detecting means includes a first low-pass filter for providing an output indicative of the average amplitude of said input signal over said preceding selected period in response to the rectified input signal, an attenuator responsive to the rectified input signal for attenuating said rectified input signal, and a comparator connected to said low-pass filter and said attenuator for providing an output whenever the attenuator output is not less than the output of said first filter.

3. The arrangement as recited in claim 2 wherein said event detecting means further includes a time dependent delay unit responsive to the output of said comparator for providing said event-indicating signal of a duration definable as $t_{event}$, where $t_{event} = t_{on} + t_d$, and wherein $t_{on}$ is the duration of the output of said comparator and $t_d$ is a function of $t_{on}$.

4. The arrangement as recited in claim 2 further including a rectifier for receiving said input signal and a second low-pass filter of a preselected time constant connected to the output of said rectifier for providing an output which is a function of the input signal amplitude over a period which is a function of the time constant of said second low-pass filter, and wherein said means for sampling sample any combination of the output of said second low-pass filter, the variable amplitude direct-current signal provided by said envelope detecting means and the signal provided by said signal crossing detecting means at selected rates.

5. The arrangement as recited in claim 4 wherein said means for sampling, in the absence of said event-indicating signal, sample the output of said rectifier and second filter at a first rate and in the presence of said event-indicating signal, sample the output signals of said envelope detecting means and said signal crossing detecting means at a second rate greater than said first rate.

6. The arrangement as recited in claim 5 further including variable filter means coupled to said rectifier and second filter and responsive to said input signal for filtering said input signal prior to supplying it to said rectifier second filter.

7. The arrangement as recited in claim 6 wherein said event detecting means further includes a time dependent delay unit responsive to the output of said comparator for providing said event-indicating signal of a duration definable as $t_{event}$ where $t_{event} = t_{on} + t_d$ and wherein $t_{on}$ is the duration of the output of said comparator and $t_d$ is a function of $t_{on}$.

8. In a seismic data system of the type to which a variable frequency and amplitude seismic signal is supplied as an input signal, an arrangement comprising:
   event detecting means responsive to said input signal for providing an event-indicating signal of a duration which is a function of a duration during which the amplitude of said input signal exceeds by a preselected ratio the average amplitude of said input signal over a preceding selected duration, the event detecting means including a first low-pass filter for providing an output indicative of the average amplitude of said input signal over said preceding selected period in response to the rectified input signal, an attenuator responsive to the rectified input signal for attenuating said rectified input signal, and a comparator connected to said low-pass filter and said attenuator for providing an output whenever the attenuator output is not less than the output of said first filter.

9. The arrangement as recited in claim 8 wherein said event detecting means further includes a time dependent delay unit responsive to the output of said comparator for providing said event-indicating signal of a duration which is longer than the duration of the output of said comparator by a factor which is a function of the comparator output duration.

10. In a data compression system of the type to which a variable frequency and amplitude signal is supplied as an input signal, the arrangement comprising:
   envelope detecting means responsive to said input signal for providing a variable amplitude direct-current output signal, representing the envelope of said input signal, said envelope detecting means including means for rectifying said input signal;
   signal crossing detecting means responsive to said input signal for providing an output signal indicative of the number of crossings of said input signal with respect to a reference potential;
   event detecting means responsive to said rectified input signal for providing an event-indicating signal of a duration which is not less than a duration during which the amplitude of said rectified input signal exceeds by a preselected ratio the average amplitude of said rectified input signal over a preceding selected period; and
   means for sampling the output signals of said envelope detecting means and said signal crossing detecting means during the duration of said event-indicating signals.

11. The arrangement as recited in claim 10 wherein said event detecting means includes a first low-pass filter for providing an output indicative of the average amplitude of said input signal over said preceding selected period in response to the rectified input signal, an attenuator responsive to the rectified input signal for attenuating said rectified input signal, and a comparator connected to said low-pass filter and said attenuator for providing an ouput whenever the attenuator output is not less than the output of said first filter.

12. The arrangement as recited in claim 11 wherein said event detecting means further includes a time dependent delay unit responsive to the output of said comparator for providing said event-indicating signal of a duration definable as $t_{event}$, where $t_{event} = t_{on} + t_d$, and wherein $t_{on}$ is the duration of the output of said comparator and $t_d$ is a function of $t_{on}$.

13. The arrangement as recited in claim 11 further including a rectifier for receiving said input signal and a second low-pass filter of a preselected time constant connected to the output of said rectifier for providing an output which is a function of the input signal amplitude over a period controlled by said preselected time constant, and wherein said means for sampling sample any combination of the output of said second low-pass filter, the variable amplitude direct-current signal provided by said envelope detecting means and the signal provided by said signal crossing detecting means at selected rates.

14. The arrangement as recited in claim 13 wherein said means for sampling, in the absence of said event-indicating signal, sample the output of said second filter at a first rate and in the presence of said event-indicating signal, sample the output signals of said envelope detecting means and said signal crossing detecting means at a second rate greater than said first rate.

15. The arrangement as recited in claim 14 further including variable filter for filtering said input signal prior to supplying it to said rectifier.

16. The arrangement as recited in claim 15 wherein said event detecting means further includes a time dependent delay unit responsive to the output of said comparator for providing said event-indicating signal of a duration definable as $t_{event}$ where $t_{event} = t_{on} + t_d$ and wherein $t_{on}$ is the duration of the output of said comparator and $t_d$ is a function of $t_{on}$.

17. In a data system of the type to which a variable frequency and amplitude signal is supplied as an input signal, an arrangement comprising:
   event detecting means responsive to said input signal for providing an event-indicating signal of a duration which is a function of a duration during which the amplitude of said input signal exceeds the average amplitude of said input signal by a preselected ratio over a preceding selected duration, said event detecting means including a first low-pass filter for providing an output indicative of the average amplitude of said input signal over said preceding selected period, an attenuator responsive to the input signal for attenuating said input signal, by a preselected factor and a comparator connected to said low-pass filter and said attenuator for providing an output whenever the attenuator output is not less than the output of said filter.

18. The arrangement as recited in claim 17 wherein said event detecting means further includes a time dependent delay unit responsive to the output of said comparator for providing said event-indicating signal of a duration which is longer than the duration of the output of said comparator by a factor which is a function of the comparator output duration.

* * * * *